(12) United States Patent
Lai

(10) Patent No.: US 6,640,390 B1
(45) Date of Patent: Nov. 4, 2003

(54) STRUCTURE FOR CONFINING A VALVE KNOB

(76) Inventor: Hung-Lin Lai, No. 5-3, Chi Pan Lane, Kou Chien Li, Lu Kang Township Chang Hua Hsien (TW)

( * ) Notice: Subject to any disclaimer, the term of this patent is extended or adjusted under 35 U.S.C. 154(b) by 0 days.

(21) Appl. No.: 10/115,737

(22) Filed: Apr. 5, 2002

(51) Int. Cl.⁷ .............................. E05B 1/00; F16K 31/00
(52) U.S. Cl. .............................. 16/441; 16/414; 16/417; 251/288
(58) Field of Search .................... 16/441, 414, 417, 16/433; 251/208, 288

(56) References Cited

U.S. PATENT DOCUMENTS

| | | | | |
|---|---|---|---|---|
| 4,499,630 A | * | 2/1985 | Harris et al. ................... | 16/441 |
| 5,048,792 A | * | 9/1991 | Fischer ......................... | 251/297 |
| 5,123,123 A | * | 6/1992 | Hart et al. ...................... | 4/684 |
| 5,345,838 A | * | 9/1994 | Howie, Jr. ...................... | 74/553 |
| 5,568,708 A | * | 10/1996 | Kassardjian et al. ........... | 52/301 |
| 5,857,242 A | * | 1/1999 | Pizzo et al. .................... | 16/441 |
| 5,918,626 A | * | 7/1999 | Strong et al. ............. | 137/454.5 |
| 6,014,984 A | * | 1/2000 | Herron ........................ | 73/61.43 |
| 6,056,201 A | * | 5/2000 | Ta ............................ | 236/12.12 |
| 6,073,647 A | * | 6/2000 | Cook et al. .............. | 137/454.6 |
| 6,125,511 A | * | 10/2000 | Woods ........................ | 16/422 |

* cited by examiner

Primary Examiner—Anthony Knight
Assistant Examiner—André L. Jackson
(74) Attorney, Agent, or Firm—Harrison & Egbert

(57) ABSTRACT

A valve knob is provided with a first confinement slot and a second confinement slot symmetrical to the first confinement slot. Both confinement slots have a first stop wall and a second stop wall to facilitate the confining of the valve knob at ON position and OFF position in conjunction with an arresting block of the valve body.

1 Claim, 10 Drawing Sheets

STRUCTURE FOR CONFINING A VALVE KNOB

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a valve knob, and more particularly to a confinement structure of the valve knob.

BACKGROUND OF THE INVENTION

As shown in FIG. 1, the conventional valve knob 10 is provided in a fastening portion 11 thereof with two stop edges 12 and 13, which are perpendicular to each other. The valve body 14 is provided with a tubular projection 15 which is provided in one side with an arresting block 16. The valve knob 10 is turned an angle of 90 degrees so as to open or close the valve, as shown in FIG. 2. The valve knob 10 is confined by means of the two stop edges 12 and 13 is conjunction with the arresting block 16 of the valve body 14.

As shown in FIGS. 3 and 4, the conventional valve knob 10 can be easily assembled with the valve body 14 in a wrong direction such that the stop edges 12 and 13 of the valve knob 10 are incorrectly situated, thereby resulting in an increase in rejection rate.

BRIEF SUMMARY OF THE INVENTION

The primary objective of the present invention is to provide a valve knob which is free of the deficiency of the prior art valve knob described above.

The valve knob of the present invention is provided in the fastening portion with two symmetrical confinement slots, each having a radian of 90 degrees. Either one of the two symmetrical confinement slots can be used to confine the positions of the valve knob in conjunction with the arresting block of the valve body, thereby enhancing the assembly efficiency of the valve.

The features and the advantages of the present invention will be more readily understood upon a thoughtful deliberation of the following detailed description of the present invention with reference to the accompanying drawings.

DETAILED DESCRIPTION OF THE INVENTION

Figure 1:
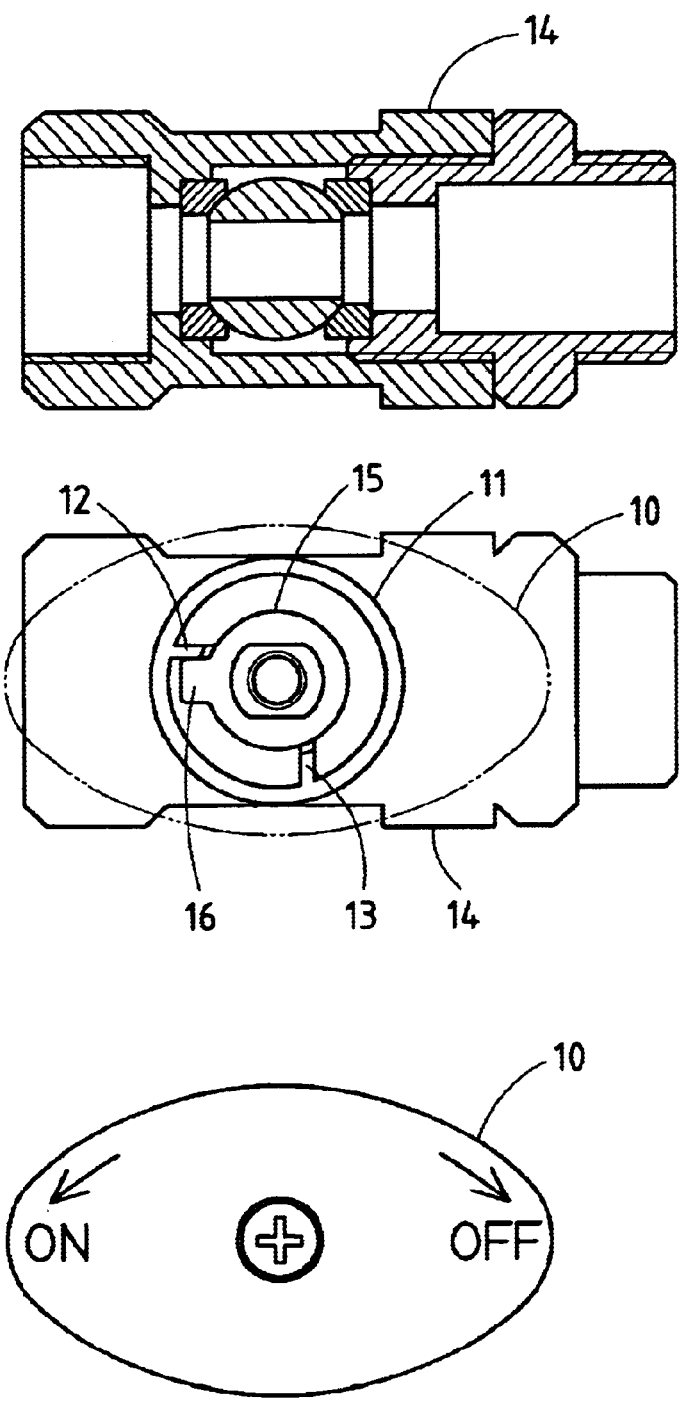
FIG. 1 shows a schematic view of a prior art valve knob in the "ON" position.
Figure 2:
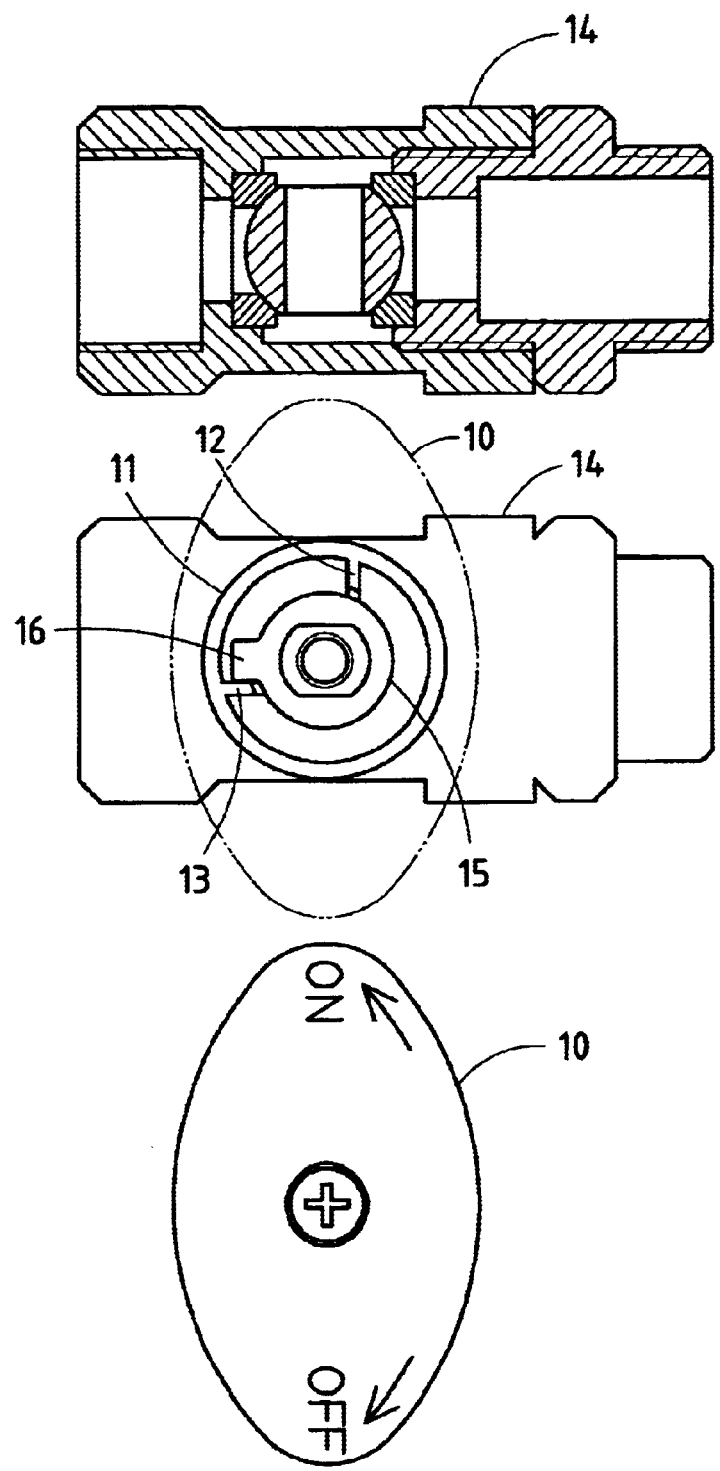
FIG. 2 shows a schematic view of the prior art valve knob in the "OFF" position.
Figure 3:
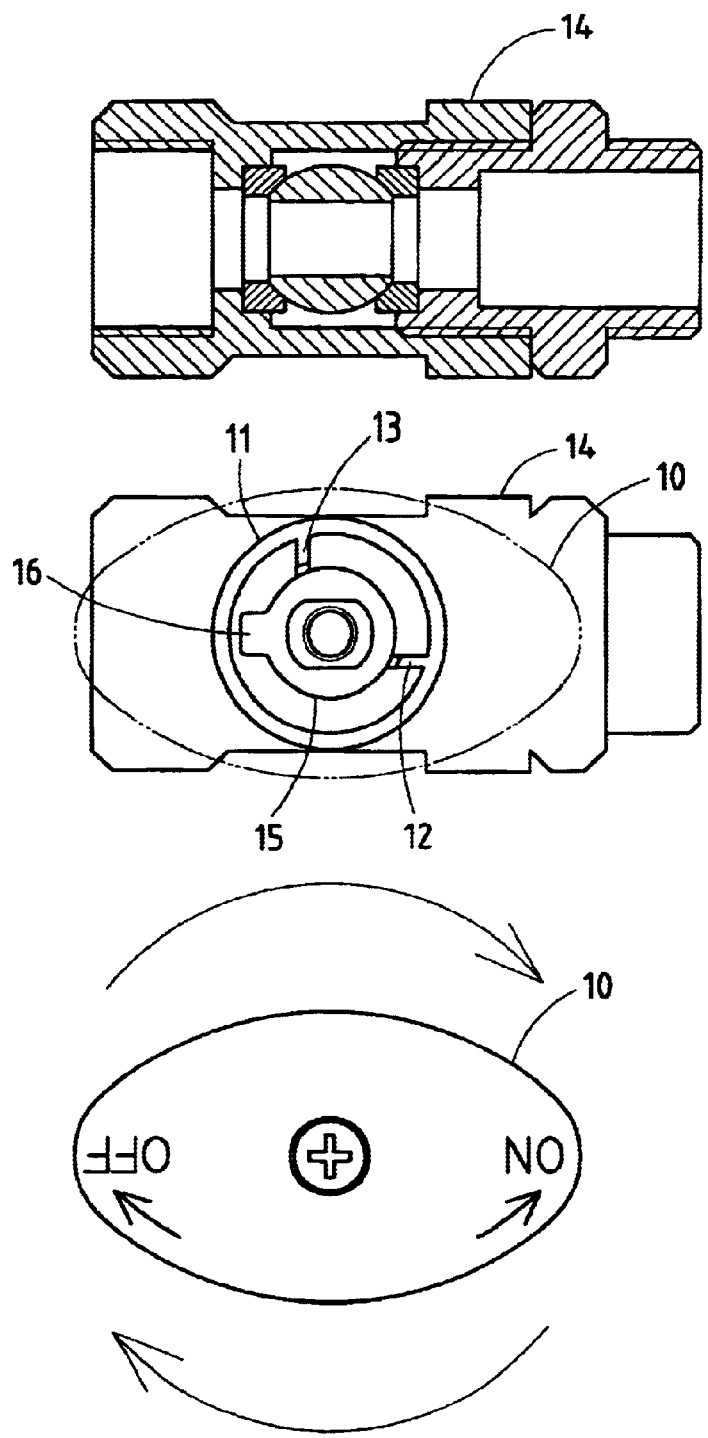
FIG. 3 shows a schematic view of the prior art valve knob being incorrectly assembled with the valve body.
Figure 4:
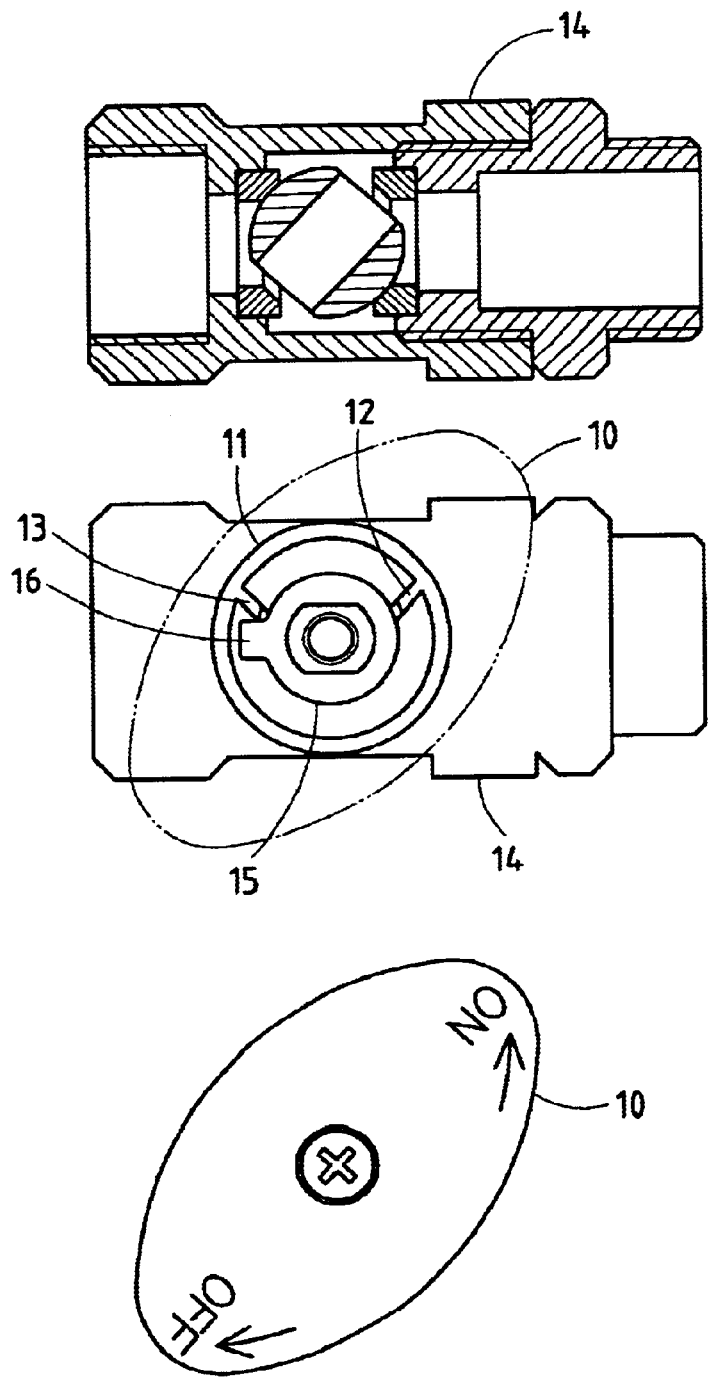
FIG. 4 shows a schematic view of the consequence of the incorrect assembly of the prior art valve knob.
Figure 5:
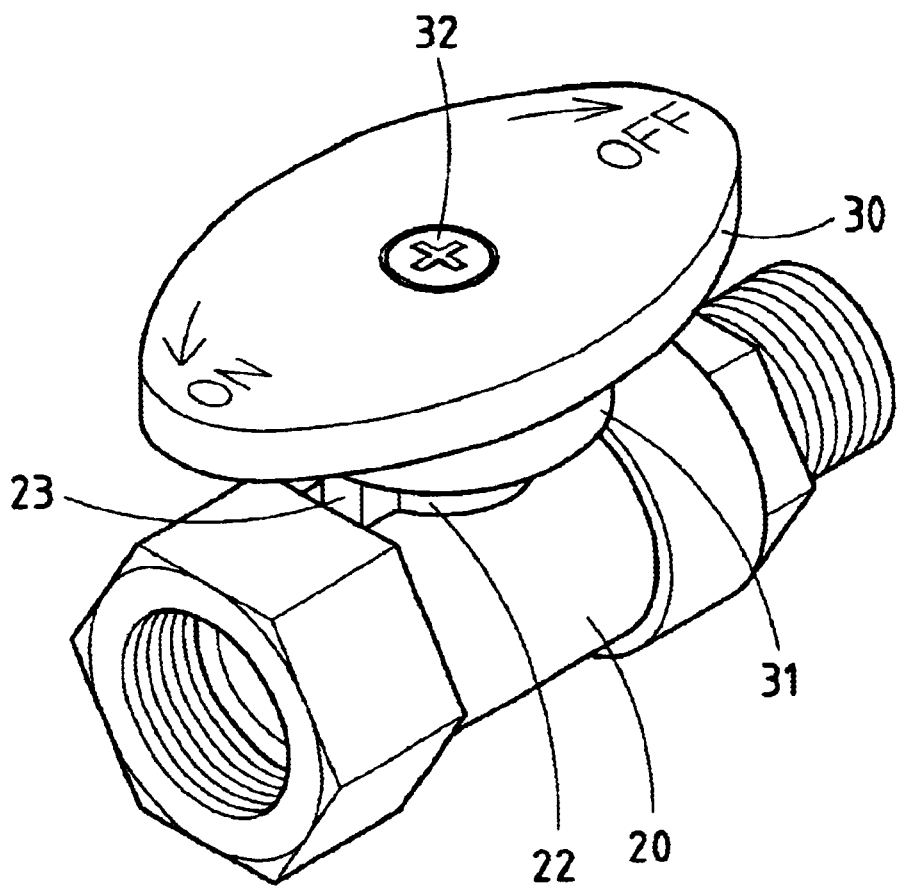
FIG. 5 shows a perspective view of the present invention.
Figure 6:
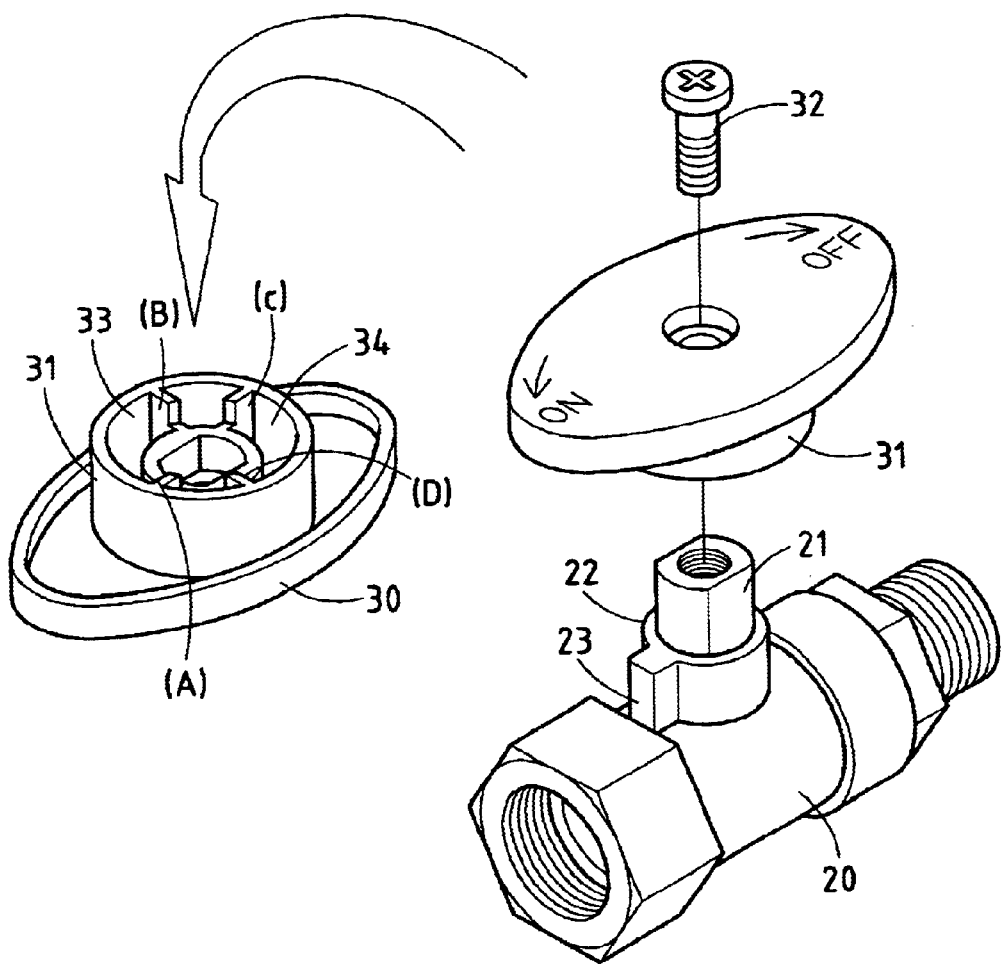
FIG. 6 shows an exploded perspective view of the present invention.

As shown in FIGS. 5–8, a valve knob 30 of the present invention is fastened with a link rod 21 of a ball valve 24, so as to turn the ball valve 24 "ON" or "OFF". The ball valve 24 is rotatably disposed in a valve body 20 which is provided in the outer wall with a tubular projection 22 embracing the link rod 21. The tubular projection 22 is provided with an arresting block 23 which is intended to cooperate with the valve knob 30 in the course of opening or closing the ball valve 24.

The valve knob 30 is provided in the underside with a fastening portion 31 of a tubular construction. The valve knob 30 is fastened to the valve body 20 such that the fastening portion 31 of the valve knob 30 is fastened by a bolt 32 to the link rod 21 of the ball valve 24. The hollow fastening portion 31 of the valve knob 30 is provided with two symmetrical confinement slots 33 and 34, which are opposite in location to each other. The first confinement slot 33 has a radian of 90 degrees, and two stop walls "A" and "B". Similarly, the second confinement slot 34 has a radian of 90 degrees, and two stop walls "C" and "D".

Figure 7:
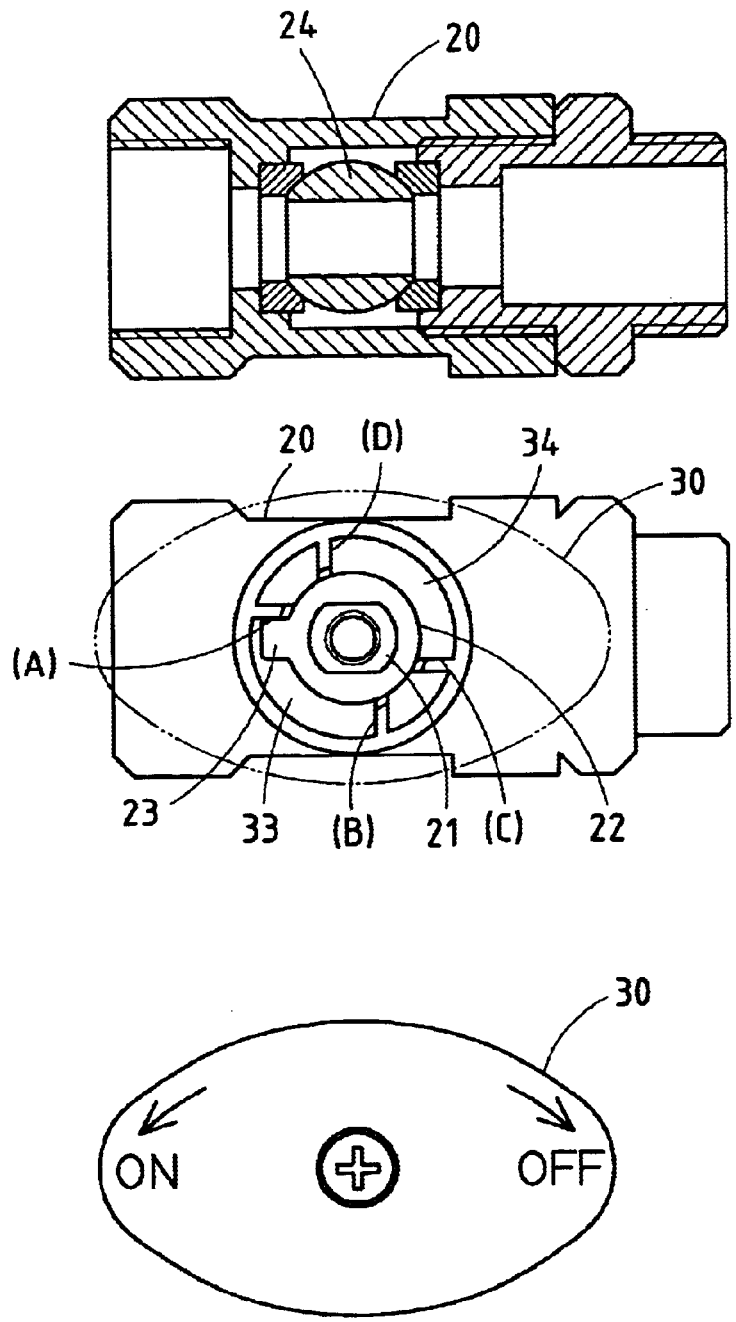
FIG. 7 shows a schematic view of the present invention in the "ON" position by using one of the two confinement slots.
Figure 8:
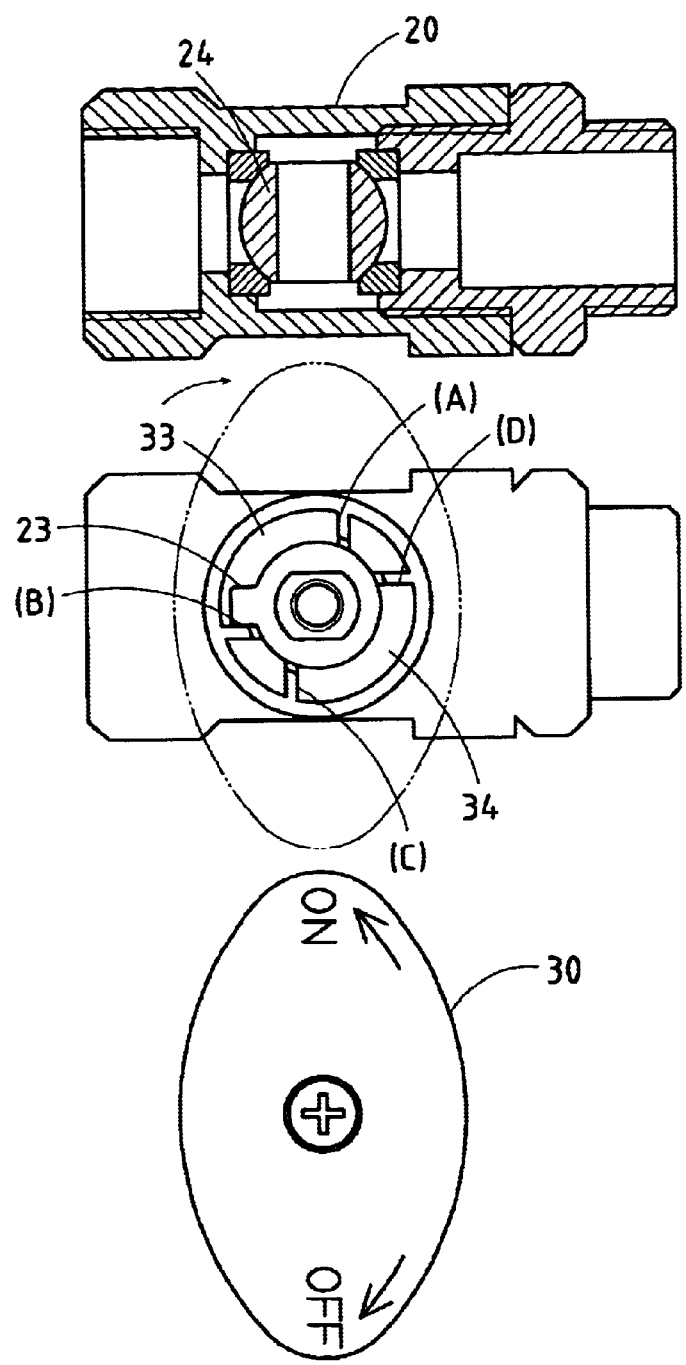
FIG. 8 shows a schematic view of the present invention in the "OFF" position by using one of the two confinement slots.

As shown in FIG. 7, when the first stop wall "A" of the first confinement slot 33 is arrested by the arresting block 23, the ball valve 24 is opened to permit the passage of fluid. As the valve knob 30 is turned clockwise such that the second stop wall "B" of the first confinement slot 33 is arrested by the arresting block 23 of the valve body 20, as shown in FIG. 8, the ball valve 24 is closed to block the passage of fluid.

Figure 9:
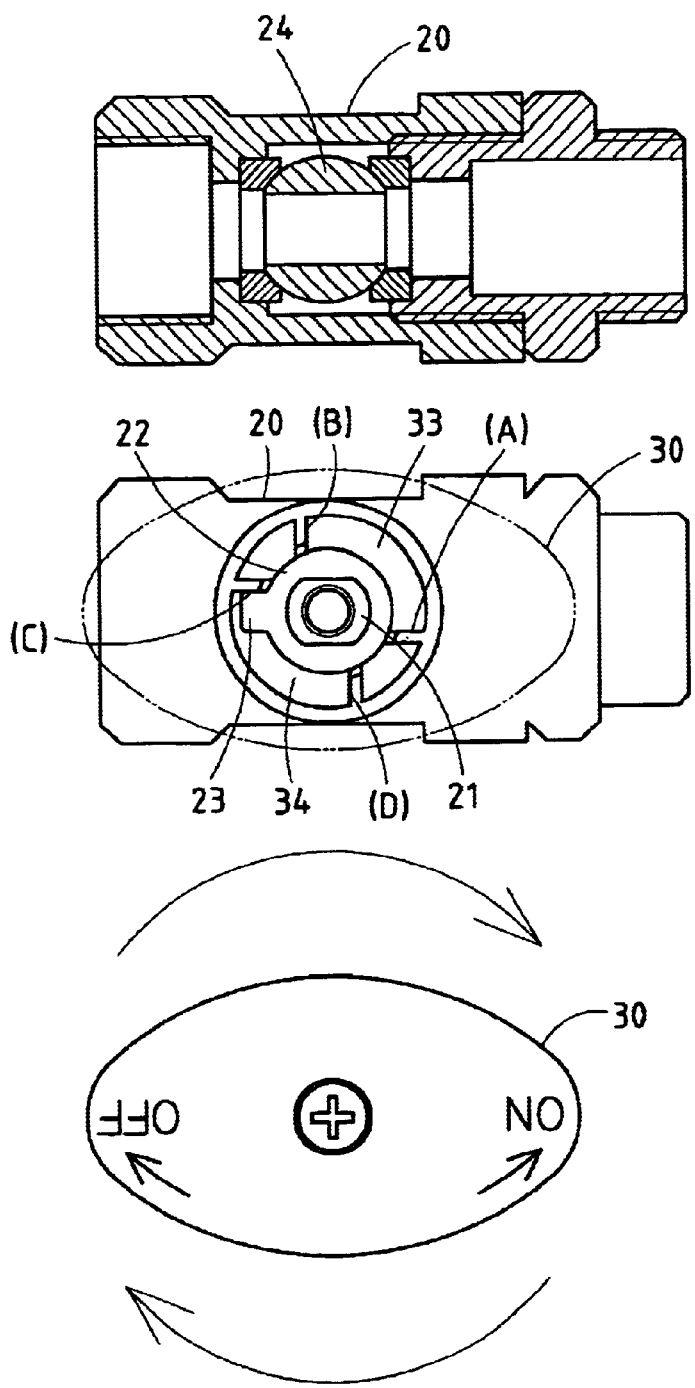
FIG. 9 shows a schematic view of the present invention in the "ON" position by using the other one of the two confinement slots.
Figure 10:
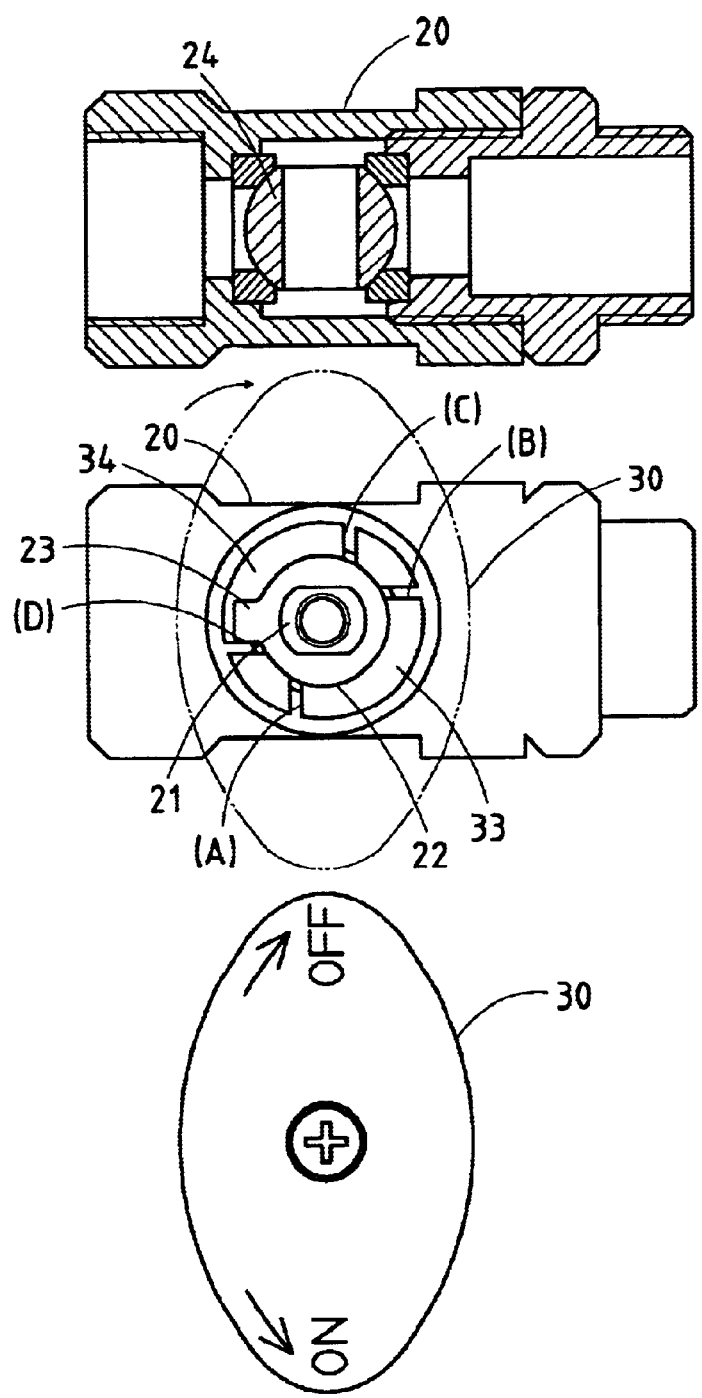
FIG. 10 shows a schematic view of the present invention in the "OFF" position by using the other one of the two confinement slots.

As shown in FIG. 9, the valve knob 30 of the present invention is fastened with the link rod 21 of the ball valve 24 such that the valve knob 30 is to be confined by the second confinement slot 34. When the valve knob 30 is in the "ON" position, the ball valve 24 is opened to permit the passage of fluid. In the meantime, the first stop wall "C" of the second confinement slot 34 is arrested by the arresting block 23 of the valve body 20, as shown in FIG. 9. When the valve knob 30 is turned clockwise such that the second stop wall "D" is arrested by the arresting block 23 of the valve body 20, the ball valve 24 is closed to block the passage of fluid, as shown in FIG. 10.

Each time when the valve knob 30 of the present invention is turned an angle of 90 degrees, from "ON" to "OFF"

or from "OFF" to "ON", the stop walls "A" and "B" of the first confinement slot 33 or the stop walls "C" and "D" of the second confinement slot 34 are exactly arrested by the arresting block 23 of the valve body 20. The assembly efficiency of the valve knob 30 of the present invention is thus greatly enhanced, thanks to the first confinement slot 33 and the second confinement slot 34 of the valve knob 30.

I claim:

1. A valve assembly comprising:

a valve body having an interior passageway with a ball valve disposed rotatably therein, said ball valve having a channel formed there through, said valve body having a tubular projection extending upwardly therefrom, said valve body having a link rod extending upwardly from said ball valve through said tubular projection;

an arresting block extending outwardly of said tubular projection;

a valve knob having a fastening portion extending from an underside thereof, said fastening portion being of a generally tubular shape, said fastening portion being engaged with said link rod of said ball valve, said valve knob movable between a first position in which, said channel of said ball valve is axially aligned with said interior passageway and a second position in which said channel of said ball valve is transverse to said interior passageway, said fastening portion having a first confinement slot and a second confinement slot symmetrical to said first confinement slot, said first confinement slot having a radian of 90 degrees, said radian of said first confinement slot being defined by an inner surface of a first stop wall and an inner surface of a second stop wall, said inner surface of said first stop wall contacting said arresting block when said valve knob is in said first position, said inner surface of said second stop wall contacting said arresting block when said valve knob is in said second position, said second confinement slot having a radian of 90 degrees, said radian of said second confinement slot being defined by an inner surface of a third stop wall and a inner surface of a fourth stop wall, an outer surface of said first stop wall and an outer surface of said third stop wall defining a radian of less than 90 degrees therebetween, an outer surface of said second stop wall and an outer surface of said fourth stop wall defining a radian of less than 90 degrees therebetween.

\* \* \* \* \*